United States Patent [19]
Saint-Cyr et al.

[11] Patent Number: 5,712,558
[45] Date of Patent: Jan. 27, 1998

[54] OPTICALLY ACTUATED AND CONTROLLED DIMMER TYPE LIGHT SWITCH

[76] Inventors: Pierre Saint-Cyr, 5524, St-Patrick, Suite 300, Montreal, Quebec, Canada, H4E 1A8; Louis Bacon, 100, Francois, apt.305, Iles des Soeurs, Québec, Canada, H3E 1G2; Marc Saint-Cyr, 755, Cr. Savard, Brossard, Quebec, Canada, J4X 1X9; Normand Saint-Cyr, 100, Francois, apt.209, Iles des Soeurs, Quebec, Canada, H3E 1G2

[21] Appl. No.: 372,246
[22] Filed: Jan. 13, 1995
[51] Int. Cl.⁶ .................................. H03K 17/945
[52] U.S. Cl. ..................... 323/322; 323/323; 323/905
[58] Field of Search ........................... 323/320, 322, 323/323, 324, 905

[56] References Cited

U.S. PATENT DOCUMENTS

| | | | |
|---|---|---|---|
| 4,305,006 | 12/1981 | Walthall et al. | 307/117 |
| 4,803,418 | 2/1989 | Ritchie | 323/324 |
| 5,005,211 | 4/1991 | Yuhasz | 323/905 |
| 5,099,193 | 3/1992 | Moseley et al. | 323/324 |
| 5,349,330 | 9/1994 | Diong et al. | 315/159 |
| 5,489,827 | 2/1996 | Xia | 315/159 |
| 5,504,306 | 4/1996 | Russell et al. | 323/236 |
| 5,566,702 | 10/1996 | Phillipp | 137/1 |

*Primary Examiner*—Jeffrey L. Sterrett
*Attorney, Agent, or Firm*—Eric Fincham

[57] ABSTRACT

An optically controlled dimmer type device which can be used to regulate the brightness of an incandescent lamp. The device can also be used to control other electrical loads such as a.c. type motors. One of the main characteristic of the device is that it is adapted to be optically controlled. The device includes a light emitting component adapted to emit light and a light receiving component positioned to receive the light reflected by an object from the light emitting component and to thereby generate an output signal. A processing circuit including a phase shift circuit is operatively associated to the light receiving component. The processing circuit is adapted to receive the ouput signal and process the output signal and thereby regulate power output to the electrical load.

17 Claims, 3 Drawing Sheets

OPTICALLY ACTUATED AND CONTROLLED DIMMER TYPE LIGHT SWITCH

BACKGROUND—FIELD OF THE INVENTION

The present invention relates to the field of electric light accessories and is particularly concerned with a regulating device which is optically actuated and controlled.

BACKGROUND—PRIOR ART

Regulating devices are known in the art and include dimmers which are devices which are used for varying the electric power applied to an electric load such as an electric light. Most conventional dimmers concurrently possess an actuating function allowing them to be used for selectively turning the power on and off.

The field of electric accessories is replete with various types of dimmers. Most of these dimmers are of the so-called "touch controlled"-type wherein a given user touches the dimmer in order to actuate a device and control the electric power applied to the latter.

These touch controlled dimmers all require manual operation of some mechanical actuating and controlling component by the user. Some dimmers use a rotating knob, others use a sliding knob as a means for allowing the user to actuate and control the electric power.

The conventional touch controlled dimmers suffer from at least five major drawbacks. Firstly, the repeated manual operation of the mechanical actuating and controlling component over a given period of time leads to the deterioration of the latter through mechanical wear.

Secondly, since human hands come into contact with various substances in the course of any given day, the hands of any potential user are likely to eventually soil the mechanical actuating and controlling component. For example, finger marks caused by fingers having been in contact with freshly printed newspapers are a common occurrence on conventional touch controlled dimmers.

Thirdly, the sequential touching of the mechanical actuating and controlling component by various individuals may in certain instances be considered as a contamination vector contributing to the widespread contamination of microbes. Indeed, the mechanical component can be used as a temporary substrate for some common microbes such as the influenza virus. If a second user shortly follows a first user contaminated with the microbe, since both users have touched the same mechanical component, the second user is more susceptible of contracting the microbe then if he or she had not used the dimmer.

Fourthly, the mechanical component used for actuating and controlling the load often forms an unesthetical protuberance.

Fifthly, conventional touch controlled dimmers cannot be properly used by individuals having impaired manual functions such as individuals suffering from muscular dystrophy.

SUMMARY OF THE INVENTION

Accordingly, it is an object of the present invention to provide an improved electric load actuating and controlling device.

A dimmer-type device in accordance with the present invention is adapted to be optically actuated and controlled instead of being mechanically actuated and controlled.

Advantages of the present invention include the fact that the dimmer circumvents the above mentioned drawbacks. Furthermore, the dimmer in accordance with the present invention conforms to conventional forms of manufacturing, is of simple construction and easy to use, thus providing a dimmer which is economically feasible, long lasting and relatively trouble-free in operation.

In accordance with one embodiment of the present invention, there is provided a regulating device for regulating an electrical load comprising: light emitting means adapted to emit light; light receiving means positioned to receive light reflected by an object from said light emitting means and to thereby generate an output signal; processing means including phase shift circuit means operatively associated therewith, the processing means adapted to receive the ouput signal and process the output signal and thereby regulate power output to the electrical load.

In one embodiment, the electric load is an incandescent lamp and the regulating device thereby controls the brightness thereof.

Preferably, the light emitting means and the light receiving means are mounted in a casing adapted to fit within an electric box for a wall casing.

Conveniently, the light emitting means comprises means for emitting a pulsed infrared light beam.

Preferably, the regulating device further includes sensitivity calibration means for calibrating threshold levels of a reflected light to activate the device.

Conveniently, the device further includes signal comparator means for comparing a reflected signal to the signal emitted by the light emitting means and to thereby filter out signals not emitted by the light emitting means.

Preferably, the processing means includes logic control means to permit a selection from a plurality of control operational modes.

In accordance with one embodiment of the present invention, there is provided a circuit arrangement, the circuit arrangement being adapted to be part of an optically controlled dimmer, the optically controlled dimmer being adapted to selectively control the power applied to a load, the power emanating from an AC power source, the AC power source having an AC phase shift angle, the circuit arrangement comprising an optical sensor means for selectively responding to the optical presence of a reflective object by emitting a sensor output signal, an AC connecting means for connecting the circuit arrangement to the AC power source, a load connecting means for connecting the load to the circuit arrangement, a Triac-type component, the Triac-type component being connected in series with both the AC connecting means and the load connecting means, a phase shift circuitry for generating a phase shift circuitry output signal having a circuitry phase shift angle, the circuitry phase shift angle being shifted relative to the AC phase shift angle, the phase shift circuitry being connected to the Triac-type component, a processing component for controlling the firing angle of the Triac-type component, the processing component comprising a built-in phase locked loop circuit, the processing component having a processing input and a processing output, the Triac-type component being connected to the processing output, the optical sensor means and the phase shift circuitry being both connected to the processing input.

Conveniently, the processing component comprises a phase lock loop, a memory means, a digital comparator, a sync phase angle pointer, a control logic component, and an output driver, both the phase lock loop and the control logic component being connected to the sync phase angle pointer, the digital comparator being also connected to the sync phase angle pointer, the memory means being connected to the phase lock loop, the memory means being also connected to both the control logic component and the digital comparator, the output driver being connected to the digital comparator.

Preferably, the optical sensor means comprises a transmitter module for emitting a transmitter pulsed infrared light beam and a receiver module for receiving a reflected infrared light beam.

Conveniently, the transmitter module comprises an oscillator for generating a relatively short and high frequency oscillator pulsed signal, a buffer for amplifying the oscillator pulsed signal into an amplified oscillator pulsed signal and an infrared transmitter for transforming the amplified oscillator pulsed signal into the transmitter pulsed infrared light beam, the buffer being connected to both the oscillator and the infrared transmitter intermediate the latters, the receiver module comprising an infrared receiver for transforming the reflected infrared light beam into a receiver pulsed output signal, an amplifier for amplifying the receiver output signal into an amplified receiver pulsed output signal, the amplifier being connected to the infrared receiver.

Preferably, the receiver module further comprises a high pass filter for transforming the amplified receiver pulsed output signal into a filtered receiver output signal by filtering out extraneous light rays and a Schmitt trigger for shaping the filtered receiver output signal into relatively sharp square waves, the high pass filter being connected to the amplifier and the Schmitt trigger being connected to the amplifier.

Conveniently, the receiver module further comprises a potentiometer for calibrating the sensitivity of the receiver module, the potentiometer being connected to the amplifier.

In a preferred embodiment, the circuit arrangement further comprises a Flip-Flop-type gate, the Flip-Flop-type gate being connected to both the Schmitt trigger and the oscillator, the Flip-Flop-type gate being also connected to the processing component, the Flip-Flop-type gate being adapted to act as a selective pulse to DC converter for sending a DC type signal to the processing component only when the relatively sharp square waves emanating from the Schmitt trigger and the relatively short and high frequency oscillator pulsed signal emanating from the oscillator are in synchronism with each other.

Conveniently, the control logic component is adapted to work in either one of a set of predetermined control logic operational modes and wherein the processing component further comprises an option select component, the option select component being connected to the control logic component, the option select component being adapted to act as an interface for allowing a user to select a given control logic operational mode.

In a second embodiment of the invention, the phase lock loop is connected to the oscillator for synchronizing them.

In this second embodiment, the circuit arrangement further comprises an oscillator timer and a delay control, the delay control component being connected to the oscillator timer and the oscillator timer being connected to the control logic component.

The present invention also proposes an optically controlled dimmer, the optically controlled dimmer being adapted to selectively control the power applied to a load, the power emanating from an AC power source, the AC power source having an AC phase shift angle, the optically controlled dimmer comprising: a circuit arrangement, the circuit arrangement comprising, an optical sensor means for selectively responding to the optical presence of a reflective object by emitting a sensor output signal, an AC connecting means for connecting the circuit arrangement to the AC power source, a load connecting means for connecting the load to the circuit arrangement, a Triac-type component, the Triac-type component being connected in series with both the AC connecting means and the load connecting means, a phase shift circuitry for generating a phase shift circuitry output signal having a circuitry phase shift angle, the circuitry phase shift angle being shifted relatively to the AC phase shift angle, the phase shift circuitry being connected to the Triac-type component, a processing component for controlling the firing angle of the Triac-type component, the processing component comprising a built-in phase locked loop circuit, the processing component having a processing input and a processing output, the Triac-type component being connected to the processing output, the optical sensor means and the phase shift circuitry being both connected to the processing input, a protective casing for protectively enclosing the circuit arrangement.

Conveniently, the optical sensor means comprises a transmitter module for emitting a transmitter pulsed infrared light beam and a receiver module for receiving a reflected infrared light beam, the optically controlled dimmer further comprising an optical means for defining the angle of transmission of the transmitter pulsed infrared light beam and for directing the reflected infrared light beam to the infrared receiver.

BRIEF DESCRIPTION OF THE DRAWINGS

Embodiments of the present invention will now be described, by way of example, in reference to the following drawings in which.

DETAILED DESCRIPTION

Figure 1:
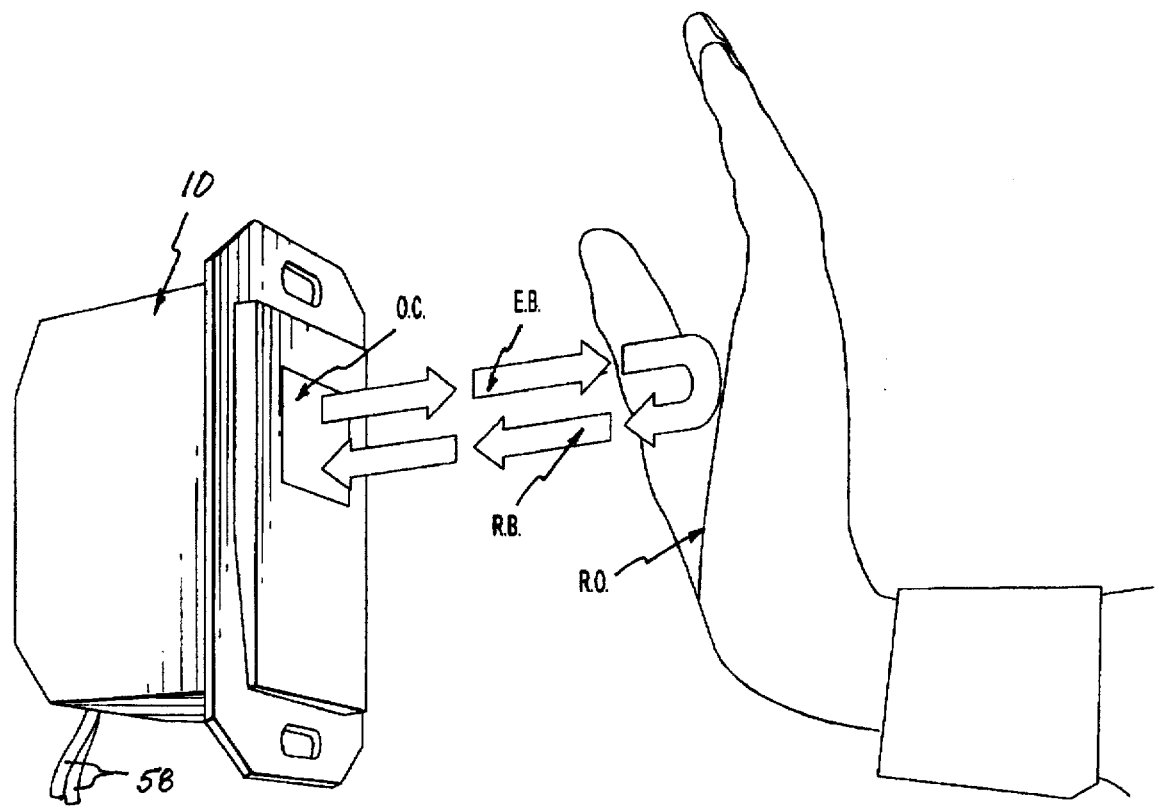
FIG. 1 is a schematic perspective view illustrating an optically controller dimmer-type device in accordance with an embodiment of the present invention being optically actuated by the presence of a human hand.
Figure 2:
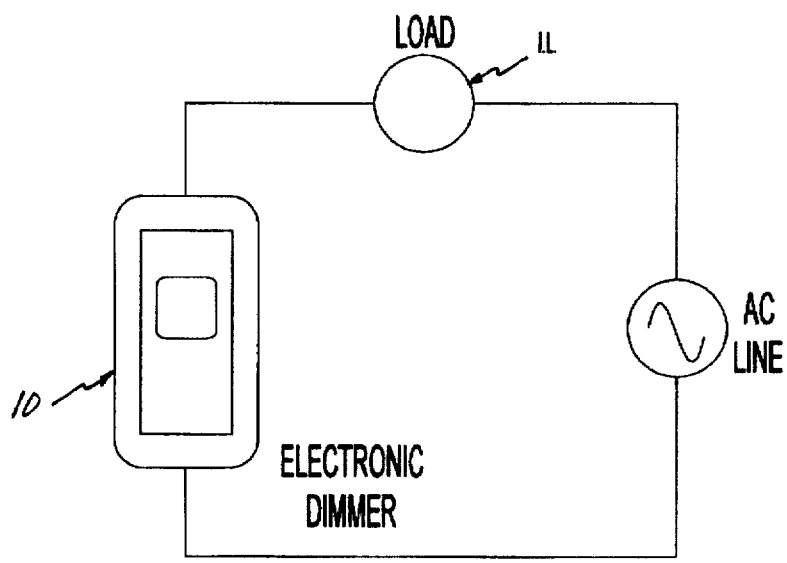
FIG. 2 is a schematic diagram illustrating electrical connections between an optically controlled dimmer-type device in accordance with an embodiment of the present invention, a power-source and an electric load.

Referring to FIG. 1, there is shown an optically controlled dimmer-type device 10 in accordance with an embodiment of the present invention. The dimmer-type device 10 is shown being actuated by the presence of a visually reflective object RO such as the hand of a user.

The dimmer type device 10 is shown emitting an emitted pulsed infrared light beam EB while reflective object RO is shown reflecting a reflected infrared light beam RB towards the dimmer-type device 10. The dimmer-type device 10 comprises an electronic circuitry 12 hereinafter described.

The electronic circuitry 12 is protectively enclosed inside a casing C having substantially the same configuration and size as a conventional casing part of a conventional touch controlled wall switch. Instead of having a mechanical actuating means such as a rotating or a sliding knob, the dimmer type device 10 has an optical component O.C.

adapted to define the angle of transmission of the emitted infrared light beam EB and to direct the reflected pulsed infrared light beam RB towards internal components of the dimmer-type device 10.

Figure 3:
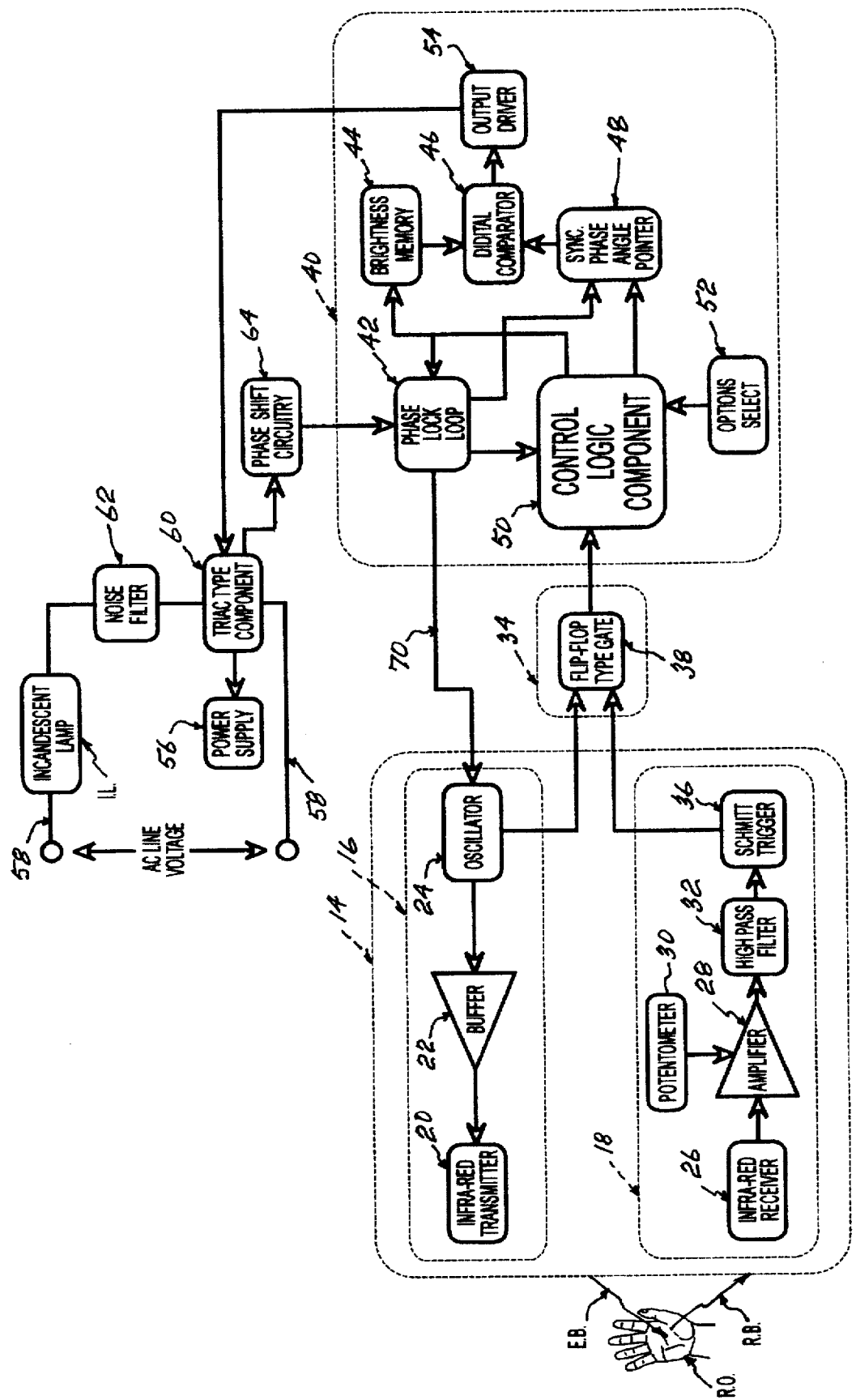
FIG. 3 is a block diagram, schematically illustrating a circuit part of an optically controlled dimmer-type device in accordance with a first embodiment of the present invention.

Referring to FIG. 3, there is shown a circuit diagram of a circuit 12 part of an optically controlled dimmer-type device 10 in accordance with a first embodiment of the present invention. The circuit 12 comprises an optical sensor means 14. The optical sensor means 14 is adapted to selectively respond to the optical presence of a reflective object RO by emitting a signal.

The optical sensor means 14 comprises a transmitter module 16 and a receiver module 18. The transmitter module 16 comprises an infrared transmitter 20, a buffer 22 and an oscillator 24. The oscillator 24 is adapted to generate a short high frequency pulsed signal. The buffer 22 is connected to both the infrared transmitter 20 and the oscillator 24 intermediate the latters. The buffer 22 is adapted to amplify the pulsed signal generated by the oscillator 24 and send the signal to the infrared transmitter 20.

Figure 4:
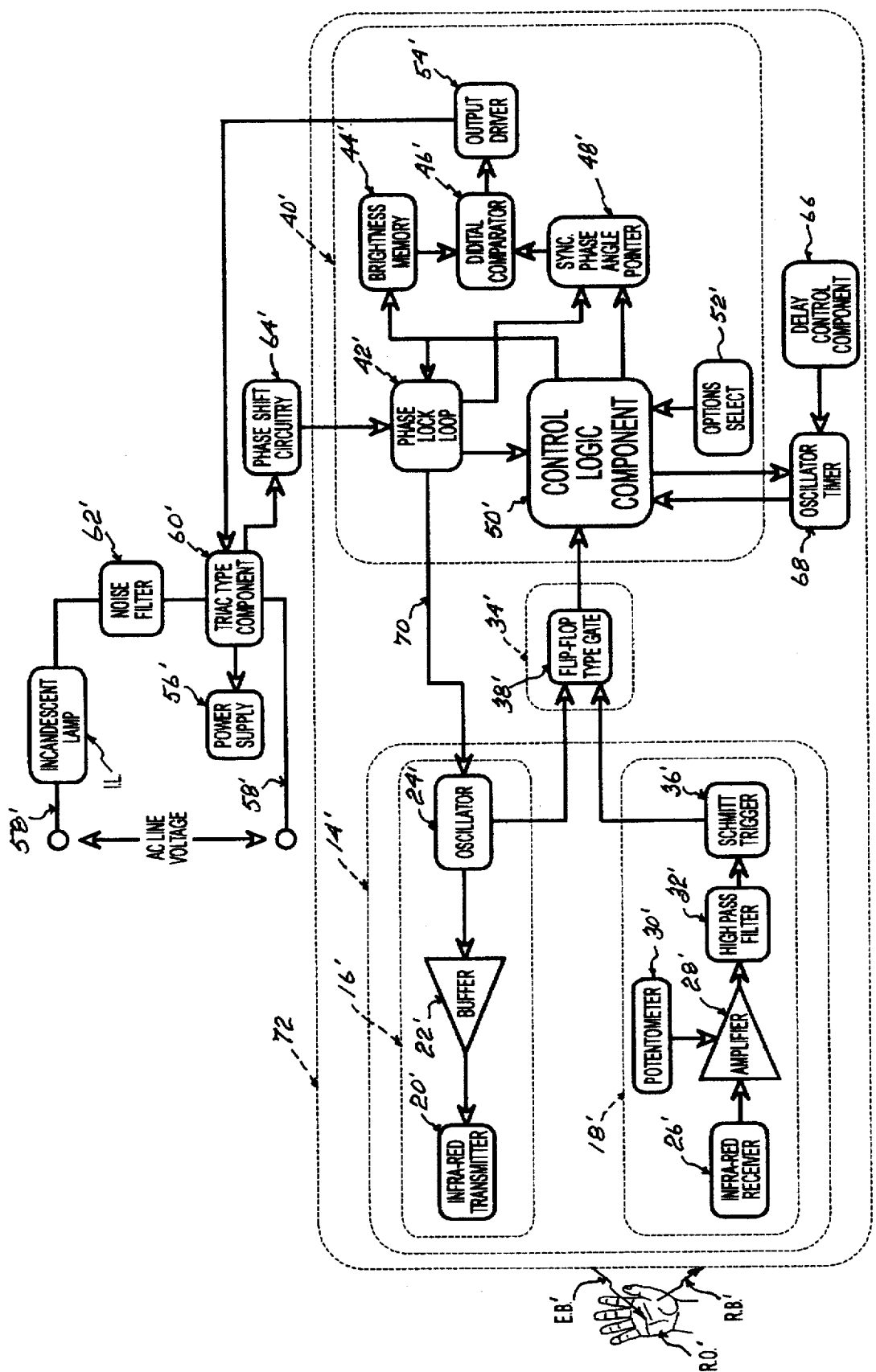
FIG. 4 is a block diagram, schematically illustrating a circuit part of an optically controlled dimmer-type device in accordance with a second embodiment of the present invention.

Upon reception of the amplified pulsed signal, the infrared transmitter 20 is adapted to generate a pulsed infrared light beam. The pulsed infrared light beam emanating from the infrared transmitter 20 is schematically illustrated in FIGS. 1, 3 and 4 by the arrow EB.

The emitted pulsed infrared light beam EB is shown impacting a reflective object RO such as the hand of a user. The reflective object OB is adapted to reflect the emitted pulsed infrared light beam EB and thus generate a pulsed reflected infrared light beam. The pulsed reflected infrared light beam is schematically illustrated in FIGS. 1, 3 and 4 by the arrow RB.

The receiver module 18 comprises an infrared receiver 26, an amplifier 28, a potentiometer 30, a high pass filter 32 and a Schmitt trigger 36. The infrared receiver 26 is adapted to receive the reflected pulsed infrared light beam RB. Upon reception of the reflected pulsed infrared light beam RB, the infrared receiver 26 is adapted to generate a corresponding pulsed signal and send the pulsed signal towards the amplifier 28.

Preferably, the optical sensor means 14 is provided with optical components for defining the angle of transmission of the emitted pulsed infrared light beam EB and for directing the reflected pulsed infrared light beam RB to the infrared receiver 26.

The amplifier 28 is connected to both the infrared receiver 26 and the high pass filter 32. The amplifier 28 is adapted to amplify the signal generated by the infrared receiver 26 and send the signal to the high pass filter 32. The function of the high pass filter 32 is to filter out signals caused by extraneous light rays generated by surrounding elements such as environmental light rays emanating from the sun, household lighting arrangements or the like.

The potentiometer 30 is connected to the amplifier 28. The function of the potentiometer 30 is to allow for the calibration of the sensitivity of the receiver module 18. The potentiometer 30 thus provides a means for selecting the threshold levels of the reflected pulsed infrared light beam RB needed to activate the dimmer-type device 12.

Since the infrared transmitter 20 generates an emitted infrared light beam EB having a predetermined value, the potentiometer 30 thus allows one to select the threshold level required for the receiver module to be activated. The adjustment of the potentiometer 30 depends on various factors such as the properties of the optical components O.C., the type of working environment and the like.

The Schmitt trigger 36 is connected to the high pass filter 32. The Schmitt trigger 36 is adapted to act as a wave shaping means for shaping into sharp squared waves the pulsed signal emanating from the high pass filter 32.

A signal comparator module 34 is connected to both the transmitter module 16 and the receiver module 18 and intermediate them. The signal comparator module 34 comprises a Flip-Flop-type gate 38. The Flip-Flop-type gate 38 is connected to both the Schmitt trigger 36 part of the receiver module 18 and the oscillator 24 part of the transmitter module 16.

The Flip-Flop-type gate 38 is adapted to act as a selective pulse to DC signal converter. The Flip-Flop-type gate 38 first compares the pulsed signals emanating from both the Schmitt trigger 36 and the oscillator 24. If both pulsed signals are in synchronism with each other, then the Flip-Flop-type gate 38 generates a DC-type signal. If both pulsed signals are not in synchronism with each other, then the Flip-Flop-type gate 38 does not generate a DC-type signal.

If pulsed signals emanating from both the Schmitt trigger 36 and the oscillator 24 are in synchronism with each other, the Flip-Flop-type gate 38 will continue to generate a DC-type signal which is sent towards a processing module 40 for as long as the reflective object RO generates a reflected pulsed light beam RB which activates the receiver module 18.

The signal comparator module 34 thus acts as a filtering means for preventing pulsed infrared generating devices other than the infrared transmitter 20 from activating the processing module 40. The Flip-Flop-type gate 38 will only send a DC-type signal to the processing module 40 if the transmitter module 16 is active and if the pulsed light beam received by the infrared receiver 26 is substantially in synchronism with the emitted pulsed infrared light beam generated by the infrared transmitter 20.

The Flip-Flop-type gate 38 is connected to a control logic component 50 which is part of a processing module 40. The processing module 40 is preferably an integrated circuit of the type sold under the LSI trademark and designated LS 7233. The LS 7233 is a monolithic, ion implanted MOS circuit that is specifically designed for brightness or ON-OFF control of incandescent lamps or speed of AC-type motors.

The processing module 40 comprises a phase lock loop 42, a brightness memory 44, a digital comparator 46, a sync phase angle pointer 48, a control logic component 50, an option select component 52 and an output driver 54.

The circuit 12 comprises a power supply 56. The power supply 56 is connected to all of the other components of the circuit 12. The dimmer-type device 10 is adapted to be connected by a terminal connecting component 58 to a source of A.C. type current such as a sixty Hertz, one hundred and twenty Volts household current.

A Triac-type component 60 is connected in series to the terminal connecting component 58. The circuit 12 is self-powered by the residual voltage left on the Triac-type component 60 when the latter is in the OFF state of the AC-type current cycle.

A noise filter 62 is also connected in series to the Triac-type component 60. The noise filter 62 is adapted to filter out the electrical noise produced by the Triac-type component 60. The electrical current emanating from the noise filter 62 is adapted to power an electric device such as a conventional incandescent lamp IL.

Although the dimmer-type device 10 is herein disclosed connected to an incandescent lamp, it should be understood that the dimmer type device 10 can be used as a regulating device with any electrically powered device such as a conventional household audiovisual equipment, an AC-type motor or the like without departing from the scope of the present invention.

A phase shift circuitry 64 is also connected to the Triac-type component 60. The phase shift circuitry 64 is adapted to shift the phase of the input signal. The phase of the signal emanating from the phase shift circuitry 64 is thus slightly shifted relatively to the phase of the signal emanating from the AC line voltage component 58.

The phase shift circuitry 64 regulates the maximal brightness level sent to the incandescent light IL by the dimmer-type device 10. Corollary, the phase shift circuitry 64 also regulates the minimal voltage value required by the power supply 56 to power the dimmer-type device 10.

The signal emanating from the phase shift circuitry 64 constitutes a signal input for the processing module 40. The output of the processing module 40 controls the power applied to the incandescent lamp IL by controlling the firing angle of the Triac-type component 60 which is connected in series with the incandescent lamp IL.

All of the internal timings of the processing module 40 are synchronized with the frequency of the input signal emanating from the phase shift circuitry 64 by means of a phase lock loop circuit built-in to the processing module 40. The output of the processing module 40 occurs once every half cycle of the input frequency. The processing module operates at 50 Hz–60 Hz input frequency.

Within the half-cycle, the output can be positioned anywhere between 159 degrees phase angle for maximum brightness and 41 degrees for minimum brightness in relation to the frequency of the input signal. The phase-lock loop synchronization produces a pure AC wave-form across the output load with no DC offset.

The phase shift circuitry 64 is connected to the phase lock loop 42 which is part of the processing module 40. The phase lock loop 42 shapes the signal emanating from the phase shift circuitry 64 into a clean squared signal.

The oscillator 24 is connected to the phase lock loop 42. The signal sent from the phase lock loop 42 to the oscillator 24 is thus a squared signal having a frequency substantially similar to the frequency provided by the AC line voltage component 58 and having a slight phase shift relative to the phase of the signal produced by the AC line voltage component 58.

Inside the processing module 40, both the phase lock loop 42 and the control logic component 50 are connected to the sync phase angle pointer 48. The digital comparator 46 is also connected to the sync phase angle pointer 48. The brightness memory 44 is connected to the phase lock loop 42, the control logic component 50 and the digital comparator 46. The output driver 54 is connected to the digital comparator 46. The option select component 52 is connected to the control logic component 50.

In use, when a reflecting object RO reflects a reflected pulsed infrared light beam RB onto the infrared receiver 26, the latter sends a signal to the amplifier 28 which amplifies the infrared receiver signal and transmits the amplified signal to the high pass filter 32. The signal is sent through the high pass filter 32 to the Schmitt trigger 36. The Schmitt trigger 36 shapes the signal emanating from the high pass filter 32 into squared pulses. The squared pulses are sent to the Flip-Flop-type gate 38 where they are compared to the signal sent by the pulse oscillator 24.

If the reflective object RO only reflects a relatively short reflected pulsed infrared light beam RB, then the Flip-Flop-type gate 38 only sends a corresponding relatively short DC-type signal to the control logic component 50. If the reflective object RO reflects a relatively long reflected pulsed infrared light beam RB, then the Flip-Flop-type gate 38 sends a corresponding relatively long DC-type signal to the control logic component 50.

When a relatively short signal (50 ms to 332 ms) is sent by the Flip-Flop-type gate 38 to the control logic component 50, the incandescent lamp IL is turned off if it was on or turn on if it was off. As hereinafter disclosed, the brightness of the incandescent lamp IL when turned on is either full or, depending on the settings, a brightness value previously stored in the memory.

When a relatively long signal (more then 350 ms) is sent by the Flip-Flop-type gate 38 to the control logic component 50, the light intensity changes slowly. As long as the signal is sent to the control logic component 50, the change continues. The direction of the change reverses whenever the maximum or minimum brightness is reached.

The control logic component 50 is adapted to work in either one of a set of predetermined control logic operational modes. Each control logic operational mode enables a given set of functions which can be accessed by a user. The option select component 52 is adapted to act as an interface for allowing the selection of a given control logic operational mode.

In a first control logic operational mode, the dimmer-type device 10 only allows the user to turn the incandescent light IL on and off.

In a second control logic operational mode, the dimmer-type device 10 allows the user not only to turn the incandescent light IL on and off but also to control the brightness of the light emitted by the incandescent lamp IL. When the light is turned off, the brightness level emitted by the light immediately prior to the lamp being shutoff is not kept in any type of memory so that when the incandescent lamp IL is turned on again, it initially emits a light having a predetermined brightness level.

In a third control logic operational mode, the dimmer-type device 12 performs the same functions as it did in the second mode except for the fact that when the incandescent lamp IL is turned off, the brightness level of the light emitted by the incandescent lamp IL immediately prior to the incandescent lamp IL being turned off is stored in a memory. In this third mode, when the incandescent lamp IL is turned on again, the initial brightness level of the light emitted by the incandescent lamp IL is substantially the same as the brightness level of the light emitted by the incandescent lamp IL immediately prior to the incandescent lamp IL being turned off.

Referring to FIG. 4, there is shown a circuit 10' part of an optical dimmer-type device in accordance with a second embodiment of the present invention. The circuit 12' is substantially similar to the circuit 12 of the first embodiment.

One of the main differences between the circuit 12 and the circuit 12' resides in the fact that the optical sensor means 14' and the processing module 40' form an integrated circuit 72, whereas only the processing module 40 of the first embodiment forms an integrated circuit.

Another main difference between the hereinbefore mentioned circuits resides in the presence of a connection 70 between the oscillator 24' and the phase lock loop 42' of the circuit 12'. The connection 70 allows for an improved synchronization between the signal emanating from the phase lock loop 42' and the signal generated by the oscillator 24'.

A further difference between the hereinbefore mentioned embodiments is the presence of a delay control component 66 and an oscillator timer 68 in the circuit 12'. The delay control component 66 is connected to the oscillator timer 68 which is in turn connected to the control logic component 50'. The delay control component 66 and the oscillator timer 68 allow for a fourth control logic operational mode.

In the fourth control logic operational mode, the dimmer-type device 10' allows the user to perform the same functions as hereinbefore described in the third mode. The fourth mode however incorporates a new, so-called "doze" function. With this new function, whenever the user actuates the dimmer-type device 10' so as to turn off the incandescent lamp IL, the latter is not immediately turned off completely.

Instead, the dimmer-type device 10' first reduces the brightness of the light generated by the incandescent lamp IL to a predetermined intermediate level. The brightness of the light emitted by the incandescent lamp IL is kept at the predetermined intermediate level for a first predetermined time. Once the first predetermined time period has elapsed, the brightness level of the light generated by the incandescent lamp IL is gradually turned off over a second predetermined time period until the incandescent lamp IL is completely turned off. The incandescent lamp IL remains turned off until it is turned on again using the dimmer-type device 10'.

Typically, the brightness level is initially reduced by approximately thirty-five percent so that the user notices the abrupt change in brightness level indicating that the turn off command was actually received by the dimmer-type device 10'. Typically, the first predetermined time period is in the range of ten seconds while the second predetermined time period is in the range of two seconds.

The purpose of this new function exclusive to the fourth mode, is to allow a user to activate the dimmer-type device 10' so as to turn off the incandescent lamp IL and allow the user a predetermined amount of time to perform certain tasks before the incandescent lamp IL is totally turned off.

This function can prove to be useful in a variety of situations. One typical example is a situation wherein the incandescent lamp IL is used as a bedside lamp positioned adjacent a bed in a large bedroom wherein the dimmer-type device 10' is in a substantially remote location relatively to the incandescent lamp IL. In such an instance, the user is given the opportunity to activate the dimmer-type device 10' so as to send a command to the incandescent lamp IL in order to turn off the latter while beneficiating from a predetermined period during which the incandescent lamp IL is not totally turned off thus allowing the user to reach the bed while moving in a relatively illuminating environment. The dimmer-type device 10' can be set so that when the user reaches the bed, the predetermined time period lapses and the incandescent lamp IL totally turns off.

The embodiments of the invention in which an exclusive privilege or property is claimed are defined as follows:

1. A regulating device for regulating an electrical load comprising:
   a transmitter module having means to generate a pulsed signal, an infrared transmitter to receive said pulsed signal and to generate a pulsed infrared light signal,
   a receiver module having an infrared receiver to generate a pulsed signal in response to a reflected infrared light signal,
   a signal comparator module connected to said transmitter module and to said receiver module to receive both said pulsed signal from said receiver module and said pulsed signal from said transmitter module, means to compare said pulsed signals and to generate an output signal when both said pulsed signals are synchronized,
   processing means including phase shift circuit means operatively associated therewith, said processing means adapted to receive said output signal and process said output signal and thereby regulate power output to said electrical load.

2. The device of claim 1 wherein said electric load is an incandescent lamp and said regulating device thereby controls the brightness thereof.

3. The device of claim 2 wherein said transmitter module and receiver module are mounted in a casing adapted to fit within an electric box for a wall casing.

4. The device of claim 1 wherein said processing means includes logic control means to permit a selection from a plurality of control operational modes.

5. The device of claim 1 further including sensitivity calibration means for calibrating threshold levels of a reflected light to activate the device.

6. An optically controlled dimmer, said optically controlled dimmer being adapted to selectively control the power applied to an incandescent lamp, said power emanating from an AC power source, said AC power source having an AC phase shift angle, said optically controlled dimmer comprising:
   a circuit arrangement, said circuit arrangement comprising
      an optical sensor means for selectively responding to the optical presence of a reflective object by emitting a sensor output signal,
      an AC connecting means for connecting said circuit arrangement to said AC power source,
      a load connecting means for connecting said load to said circuit arrangement,
      a Triac-type component, said Triac-type component being connected in series with both said AC connecting means and said load connecting means,
      a phase shift circuitry for generating a phase shift circuitry output signal having a circuitry phase shift angle, said circuitry phase shift angle being shifted relatively to said AC phase shift angle, said phase shift circuitry being connected to said Triac-type component,
      a processing component for controlling the firing angle of said Triac-type component, said processing component including a built-in phase locked loop circuit, said processing component having a processing input and a processing output, said Triac-type component being connected to said processing output, said optical sensor means and said phase shift circuitry being both connected to said processing input,
   a protective casing for protectively enclosing said circuit arrangement.

7. An optically controlled dimmer as recited in claim 6 wherein said optical sensor means comprises a transmitter module for emitting a transmitter pulsed infrared light beam and a receiver module for receiving a reflected infrared light beam, said optically controlled dimmer further comprising an optical means for defining the angle of transmission of said transmitter pulsed infrared light beam and for directing said reflected infrared light beam to said infrared receiver.

8. A circuit arrangement for use with a power regulating device to control power applied to a load, said power emanating from an AC power source, said AC power source having an AC phase shift angle, said circuit arrangement comprising:

an optical sensor means for selectively responding to the optical presence of a reflective object by emitting a sensor output signal, an AC connecting means for connecting said circuit arrangement to said AC power source, a load connecting means for connecting said load to said circuit arrangement, a Triac-type component, said Triac-type component being connected in series with both said AC connecting means and said load connecting means, a phase shift circuitry for generating a phase shift circuitry output signal having a circuitry phase shift angle, said circuitry phase shift angle being shifted relatively to said AC phase shift angle, said phase shift circuitry being connected to said Triac-type component, a processing component for controlling the firing angle of said Triac-type component, said processing component including a built-in phase lock loop circuit, said processing component having a processing input and a processing output, said Triac-type component being connected to said processing output, said optical sensor means and said phase shift circuitry being both connected to said processing input.

9. A circuit arrangement as recited in claim 8 wherein said optical sensor means comprises a transmitter module for emitting a transmitter pulsed infrared light beam and a receiver module for receiving a reflected infrared light beam.

10. A circuit arrangement as recited in claim 9 wherein said transmitter module comprises an oscillator for generating a relatively short and high frequency oscillator pulsed signal, a buffer for amplifying said oscillator pulsed signal into an amplified oscillator pulsed signal and an infrared transmitter for transforming said amplified oscillator pulsed signal into said transmitter pulsed infrared light beam, said buffer being connected to both said oscillator and said infrared transmitter intermediate the latters, said receiver module comprising an infrared receiver for transforming said reflected infrared light beam into a receiver pulsed output signal, an amplifier for amplifying said receiver output signal into an amplified receiver pulsed output signal, said amplifier being connected to said infrared receiver.

11. A circuit arrangement as recited in claim 10 wherein said receiver module further comprises a potentiometer for calibrating the sensitivity of said receiver module, said potentiometer being connected to said amplifier.

12. A circuit arrangement as recited in claim 10 wherein said receiver module further comprises a high pass filter for transforming said amplified receiver pulsed output signal into a filtered receiver output signal by filtering out signals caused by extraneous light rays and a Schmitt trigger for shaping said filtered receiver output signal into relatively sharp square waves, said high pass filter being connected to said amplifier and said Schmitt trigger being connected to said amplifier.

13. A circuit arrangement as recited in claim 12 wherein said circuit arrangement further comprises a Flip-Flop-type gate, said Flip-Flop-type gate being connected to both said Schmitt trigger and said oscillator, said Flip-Flop-type gate being also connected to said processing component, said Flip-Flop-type gate being adapted to act as a selective pulse to DC converter for sending a DC type signal to said processing component only when said relatively sharp square waves emanating from said Schmitt trigger and said relatively short frequency oscillator pulsed signal emanating from said oscillator are in synchronism with each other.

14. A circuit arrangement as recited in claim 8 wherein said processing component comprises said phase lock loop, a memory means, a digital comparator, a sync phase angle pointer, a control logic component, and an output driver, both said phase lock loop and said control logic component being connected to said sync phase angle pointer, said digital comparator being also connected to said sync phase angle pointer, said memory means being connected to both said control logic component and said digital comparator, said output driver being connected to said digital comparator.

15. A circuit arrangement as recited in claim 14 wherein said control logic component is adapted to work in either one of a set of predetermined control logic operational modes and wherein said processing component further comprises an option select component, said option select component being connected to said control logic component, said option select component being adapted to act as an interface for allowing a user to select a given control logic operational mode.

16. A circuit arrangement as recited in claim 14 wherein said phase lock loop is connected to said oscillator for synchronization.

17. A circuit arrangement as recited in claim 14 further comprising an oscillator timer and a delay control, said delay control component being connected to said oscillator timer and said oscillator timer being connected to said control logic component.

* * * * *